(12) United States Patent
Basile, II et al.

(10) Patent No.: US 6,467,668 B1
(45) Date of Patent: Oct. 22, 2002

(54) CONVEYOR CHAIN AND SYSTEM FOR LOOPED SAUSAGE PRODUCTS

(75) Inventors: Vincent L. Basile, II, West Des Moines, IA (US); Brent M. Veldkamp, Cumming, IA (US); Marcel F. Ottow, Rosmalen (NL)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 09/868,521

(22) PCT Filed: Oct. 12, 2000

(86) PCT No.: PCT/US00/28201

§ 371 (c)(1),
(2), (4) Date: Sep. 24, 2001

(87) PCT Pub. No.: WO01/28346

PCT Pub. Date: Apr. 26, 2001

Related U.S. Application Data

(60) Provisional application No. 60/159,794, filed on Oct. 15, 1999.

(51) Int. Cl.[7] .............................................. B65H 20/14
(52) U.S. Cl. ....................... 226/104; 226/105; 226/107; 226/173; 452/177
(58) Field of Search ................................ 226/104, 105, 226/107, 173, 106; 452/51, 31, 177, 183

(56) References Cited

U.S. PATENT DOCUMENTS

| | | | | |
|---|---|---|---|---|
| 4,880,105 A | * | 11/1989 | Kasai et al. ............... | 452/51 X |
| 5,085,612 A | * | 2/1992 | Muller et al. ................ | 452/51 |
| 5,092,813 A | * | 3/1992 | Kasai et al. ............... | 452/51 X |
| 5,197,915 A | * | 3/1993 | Nakamura et al. ............ | 452/51 |
| 5,354,229 A | * | 10/1994 | Markwardt et al. ........... | 452/51 |
| 5,896,809 A | * | 4/1999 | Miller ......................... | 452/51 |
| 6,213,368 B1 | * | 4/2001 | Vermeer et al. ............ | 226/104 |
| 6,257,974 B1 | * | 7/2001 | Basile, II ..................... | 425/51 |
| 6,290,591 B1 | * | 9/2001 | Hergott et al. ................. | 452/51 |

FOREIGN PATENT DOCUMENTS

| | | | |
|---|---|---|---|
| DE | 38 26 875 A | * | 2/1990 |
| EP | 0 509 624 A | * | 10/1992 |
| WO | WO-99 49737 | * | 10/1999 |

* cited by examiner

*Primary Examiner*—Michael R. Mansen
*Assistant Examiner*—Minh-Chau Pham

(57) ABSTRACT

A horizontal conveyor for linked sausage strands has a frame (10) having a horizontal operating platform (12) with opposite first (16) and second ends (18), opposite sides, a top surface (20), and a continuous perimeter wall (14) extending along the sides and first and second ends. The perimeter wall (14) is substantially semi-circular at the first end (16); and has a substantially parallel side portions at a midsection; and has end portions that converge towards each other from the side portions to meet at a semi-circular end portion (18A) at the second end (18). A channel (24) is located in the top portion in uniform inwardly spaced relation to the perimeter wall, and a continuous conveyor chain (26) is in the channel. A plurality of spaced hook members (28) are secured to the conveyor chain and have a shank (30) slidably engaging the top of the perimeter wall, and a hook portion extends downwardly and outwardly with respect to the perimeter wall. The semi-circular end portion of the second end (18) of the platform comprises a sausage loading station and has a diameter less than the distance between the side portions of the perimeter wall so that the hook portions of the hook members sliding over such end portion will travel at a speed greater than the speed of the hook members sliding over the side portions of the perimeter wall.

8 Claims, 5 Drawing Sheets

CONVEYOR CHAIN AND SYSTEM FOR LOOPED SAUSAGE PRODUCTS

This application is a national stage application filed under 35 U.S.C 371 of PCT/US00/28201, filed Oct. 12, 2000, which claims priority of Provisional Application No. 60/159,794, under 35 U.S.C. 119(e), filed Oct. 15, 1999.

BACKGROUND OF THE INVENTION

Horizontal conveyors have been used in conjunction with sausage making machines. They have a horizontally disposed conveyor chain suspended on a frame with hook elements extending outwardly therefrom to receive loops of an encased sausage strand. These hooks move forward in a stepping/cyclic motion to allow a predetermined number of linked sausages to hang from each hook. The stepping action is a disadvantage. The velocity of the chain combined with the stepping action of the chain imposed on the loops of sausages causes them to swing from the hooks whereupon the linked sausages begin to untwist.

Therefore, the principal object of the invention is to provide a horizontal conveyor for linked sausage strands that has a conveyor chain that operates at a continuous uniform speed with an operating configuration that allows hooks attached to the chain to accelerate to an increased constant speed at the time that they pick up the sausage strand from an adjacent sausage making machine.

A further object of the invention is to provide a horizontal conveyor for linked sausage strands that will not operate at variable or intermittent speeds with stopping and starting motions and which will not impart swinging motion to the loops of the sausage strands so as to eliminate unraveling of the linked strand.

These and other objects will be apparent to those skilled in the art.

SUMMARY OF THE INVENTION

A horizontal conveyor for linked sausage strands has a frame having a horizontal operating platform with opposite first and second ends, opposite sides, a top surface, and a continuous perimeter wall extending along the sides and first and second ends. The perimeter wall is substantially semi-circular at the first end; and has a substantially parallel side portions at a midsection; and has end portions that converge towards each other from the side portions to meet at a semi-circular end portion at the second end.

A channel is located in the top portion in uniform inwardly spaced relation to the perimeter wall, and a continuous conveyor chain is in the channel. A plurality of spaced hook members are secured to the conveyor chain and have a shank slidably engaging the top of the perimeter wall, and a hook portion extends downwardly and outwardly with respect to the perimeter wall. The semi-circular end portion of the second end of the platform comprises a sausage loading station and has a diameter less than the distance between the side portions of the perimeter wall so that the hook portions of the hook members sliding over such end portion will travel at a speed greater than the speed of the hook members sliding over the side portions of the perimeter wall.

DESCRIPTION OF THE PREFERRED EMBODIMENT

Figure 1:
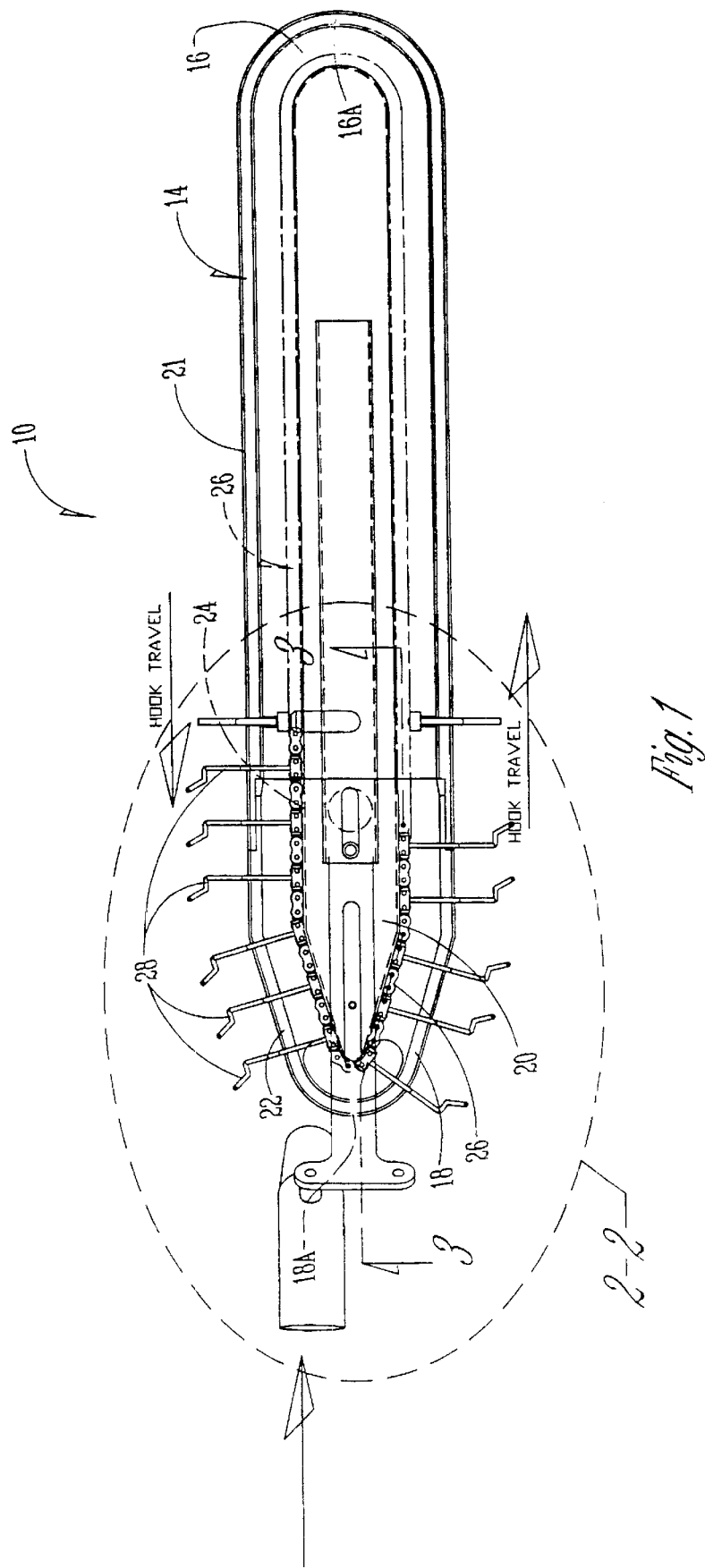
FIG. 1 is a plan view of the conveyor of this invention.
Figure 2:
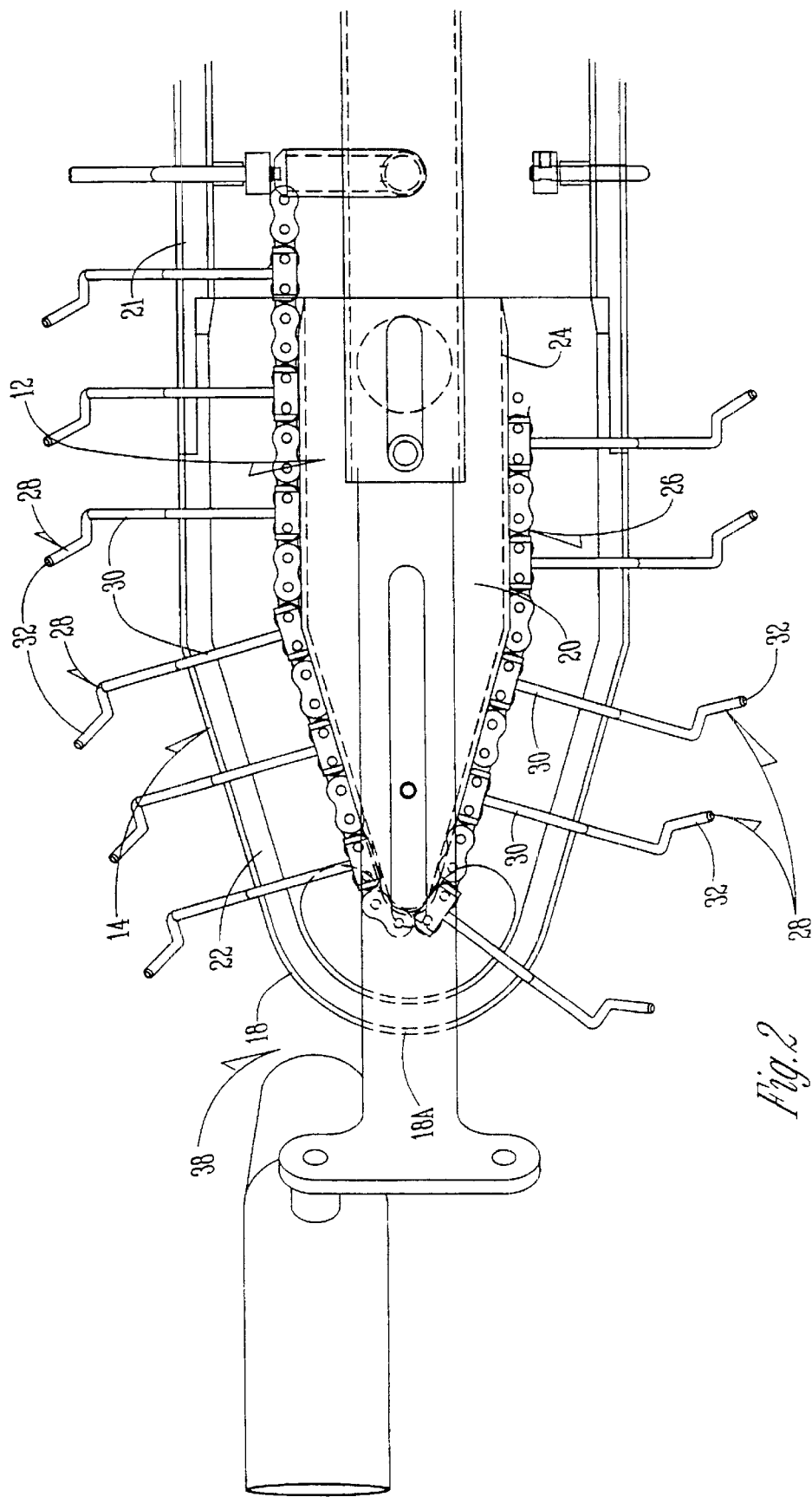
FIG. 2 is an enlarged scale plan view of the sausage loading station and forward end of the conveyor.
Figure 3:
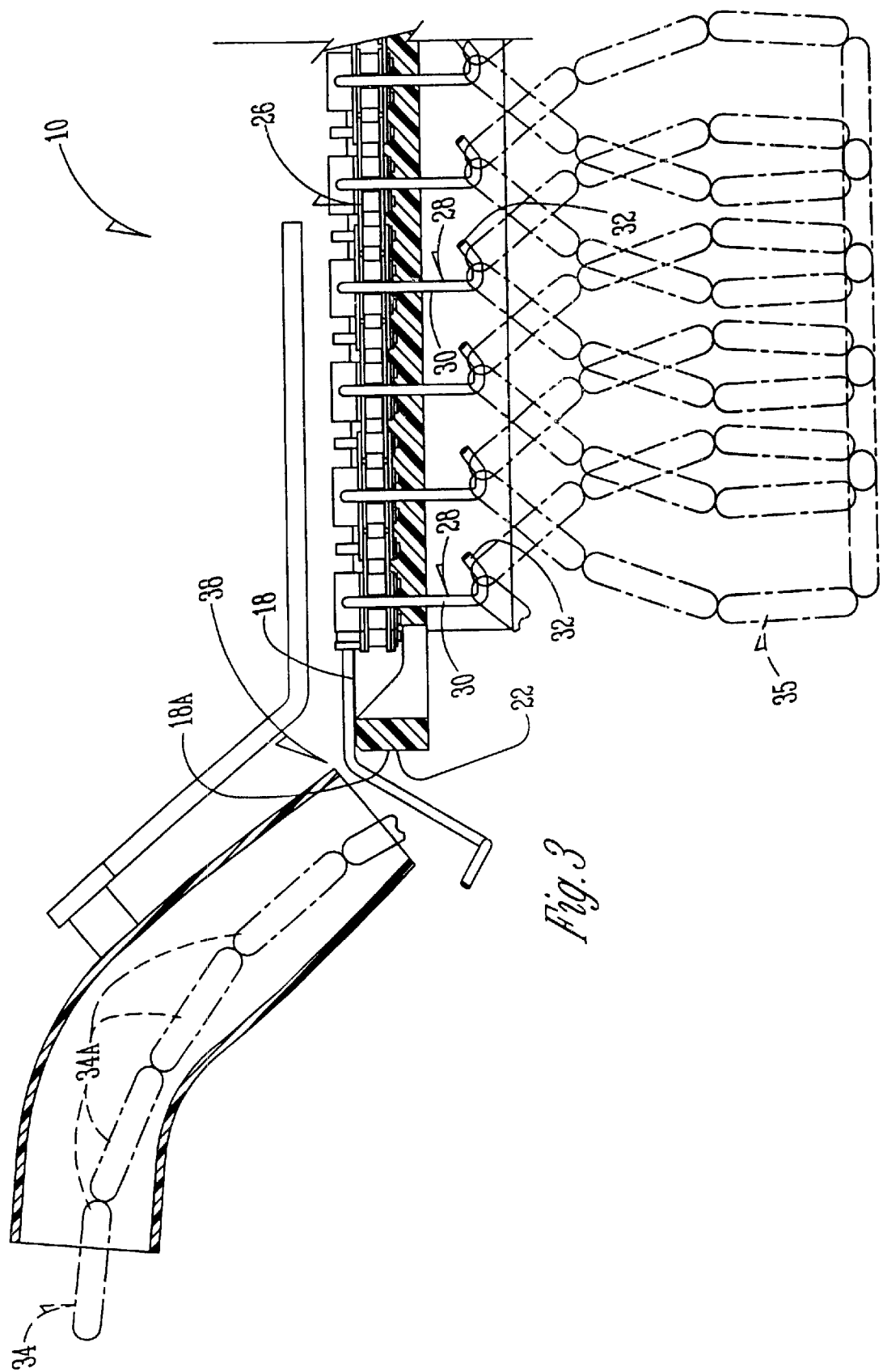
FIG. 3 is a side elevational view of the structure shown in FIG. 2.
Figure 4:
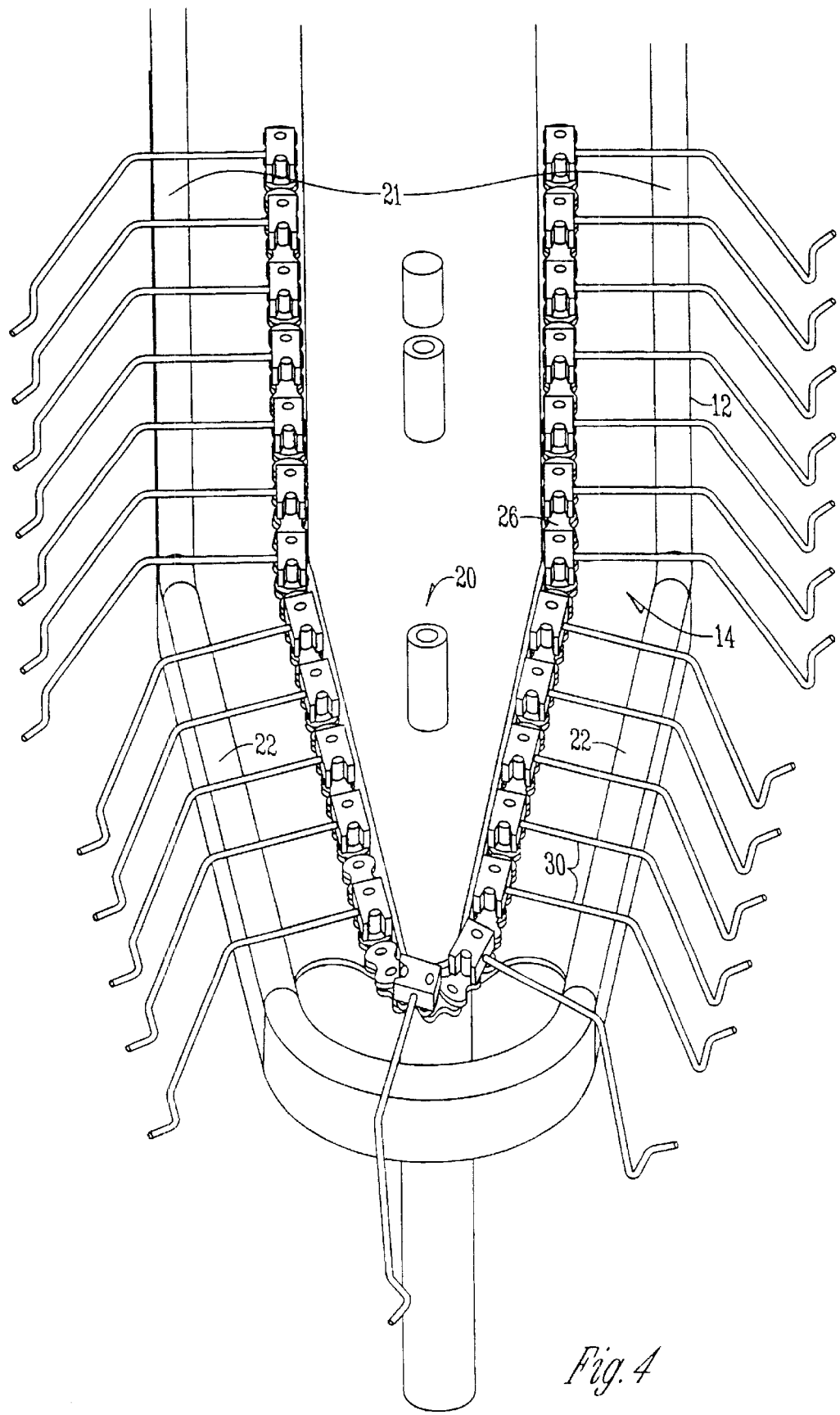
FIG. 4 is a perspective view of the forward end of the conveyor taken upstream therefrom.
Figure 5:
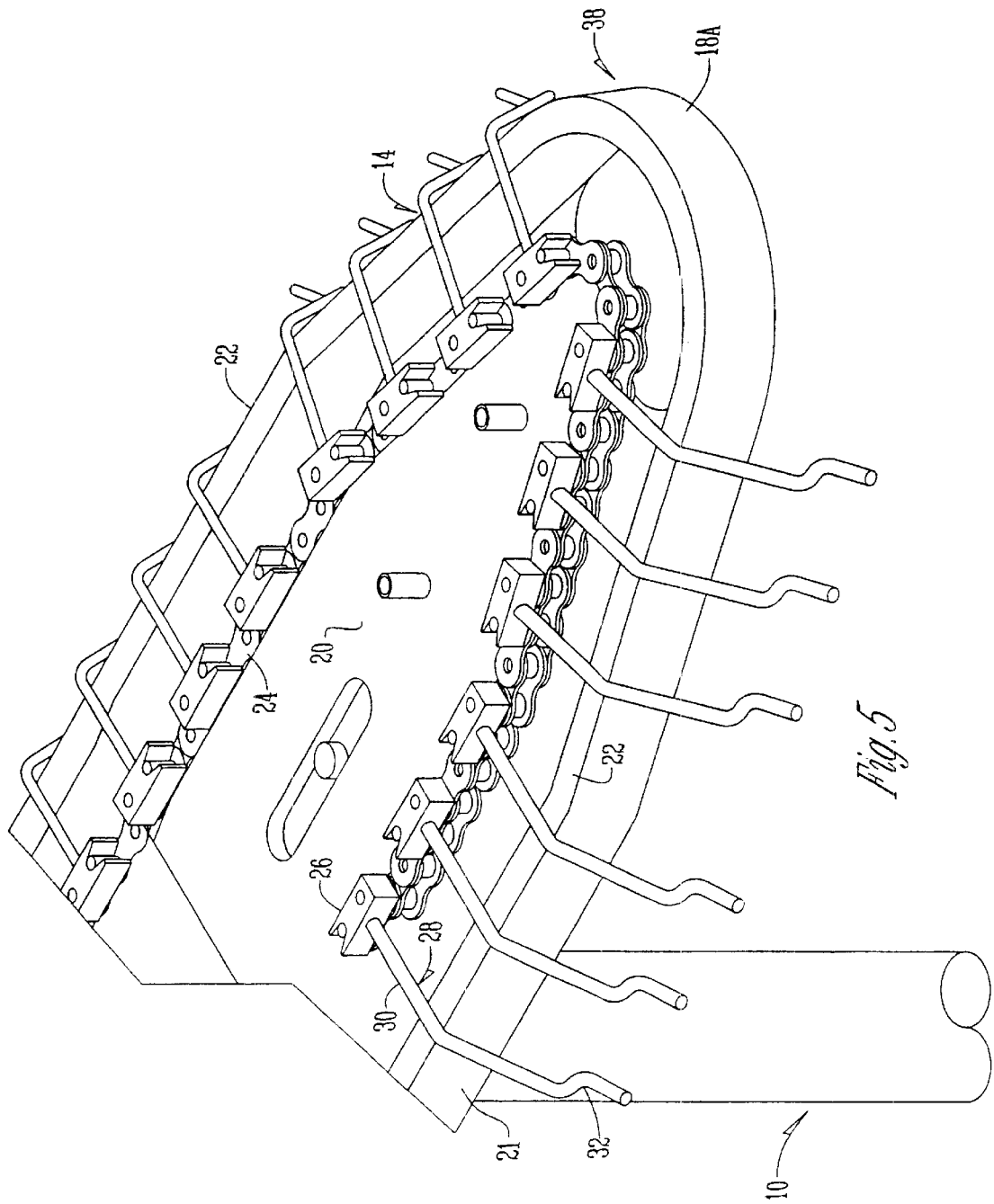
FIG. 5 is a side elevational perspective view of the forward end shown in FIG. 4.

A frame 10 has an operating platform 12 which has an outer perimeter wall 14. The platform 12 has a first end 16, a second or forward end 18, and a top surface 20 which supports wall 14. The wall 14 and platform 12 are preferably comprised of plastic.

The wall 14 has a semi-circular wall portion 16A around end 16; a smaller semi-circular wall portion 18A around forward end 18; parallel spaced sidewall portions 21 extending forwardly from wall portion 16A; and converging diagonal wall portions 22 which extend from sidewall portions 21 to wall portion 18A.

A continuous channel 24 is formed in top surface 20 in uniform spaced relation to wall 14. A continuous conveying chain 26 is slidably mounted in channel 24 and is powered in any convenient manner such as by an electric motor (not shown) to move the chain in channel 24 at a uniform continuous speed.

Spaced hooks 28 have one end secured to chain 26 in any convenient manner. The hooks 28 are comprised of an elongated shank 30 which has an inner end connected to the chain. The shank extends slidably outwardly over the wall 14, and terminates in a hook portion 32 that extends downward and outwardly from the wall 14.

An elongated strand 34 of linked sausage is delivered through conventional horn 36 of a sausage encasing and linking machine whereupon the strand flows into the path of hooks 18 which are moving past the loading station 38 at end 18. Loops 34A of linked sausages are deposited on the hooks 28 leaving a forward end 18.

Because of the small diameter of the forward wall portion 18A of the wall 14 and the correspondingly small diameter of channel 24 at the forward end and adjacent to the end wall 18A, the hooks 28 moving around end wall portion 18A momentarily have their velocity increased. Further, during that momentary period of time, the travel around the wall portion 18A is at a uniform accelerated speed for that short distance. This increased uniform velocity allows a loop 35 of sausages to be loaded on to a first hook 28 without interference with the next succeeding hook. This procedure permits a smooth loading of the loop of sausages and avoids the unwanted inertia motion of loops that often cause unraveling of the strand 34.

It is therefore seen that this invention will accomplish all of its stated objectives.

We claim:

1. A horizontal conveyor for linked sausage strands, comprising, a frame having a horizontal operating platform with opposite first and second ends, opposite sides, a top surface, and a continuous perimeter wall extending along the sides and first and second ends, the perimeter wall being substantially semi-circular at the first end; and having substantially parallel side portions at a midsection; and having end portions that converge towards each other from the side portions to meet at a semi-circular end portion at said second end, a channel in the top portion in uniform inwardly spaced relation to the perimeter wall, a continuous conveyor chain in the channel, a plurality of spaced hook members secured to the conveyor chain and having a shank slidably engaging the top of the perimeter wall, and a hook portion extending downwardly and outwardly with respect to the perimeter wall, the semi-circular end portion of said second end of the platform comprising a sausage loading station and having a diameter less than the distance between the side portions of the perimeter wall so that the hook portions of the hook members sliding over such end portion will travel at a speed greater than the speed of the hook members sliding over the side portions of the perimeter wall.

2. The conveyor of claim 1 wherein the perimeter wall is a plastic material.

3. The conveyor of claim 1 wherein the top surface in which the channel is located is a plastic material.

4. The conveyor of claim 1 wherein the perimeter wall is a plastic material, and the top surface in which the channel is located is a plastic material.

5. A horizontal conveyor for linked sausage strands, comprising, a frame having a horizontal operating platform with opposite first and second ends, opposite sides, a top surface, and a continuous perimeter wall extending along the sides and first and second ends, the perimeter wall being substantially semi-circular at the first end; and having substantially parallel side portions at a midsection; and having end portions that converge towards each other from the side portions to meet at a semi-circular end portion at said second end, a channel in the top portion in uniform inwardly spaced relation to the perimeter wall, a continuous conveyor chain in the channel, a plurality of spaced hook members secured to the conveyor chain and having a shank slidably engaging the top of the perimeter wall, and a hook portion extending downwardly and outwardly with respect to the perimeter wall, the semi-circular end portion of said second end of the platform comprising a sausage loading station and having a diameter less than the distance between the side portions of the perimeter wall.

6. The conveyor of claim 5 wherein the perimeter wall is a plastic material.

7. The conveyor of claim 5 wherein the top surface in which the channel is located is a plastic material.

8. The conveyor of claim 5 wherein the perimeter wall is a plastic material, and the top surface in which the channel is located is a plastic material.

* * * * *